April 1, 1930.                    G. E. NAGEL                    1,753,061
                                    MOLD
                              Filed May 13, 1929
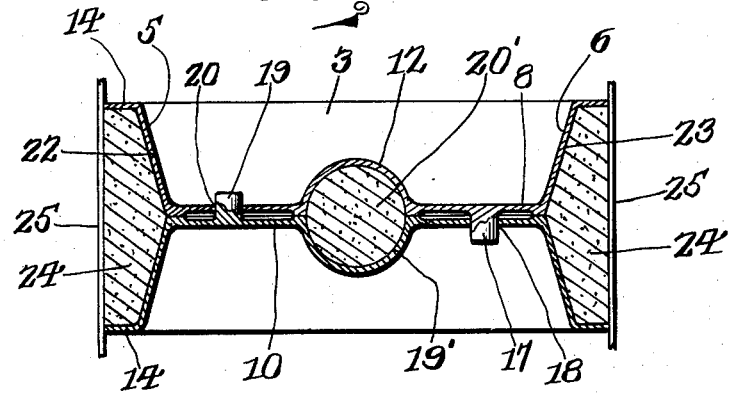
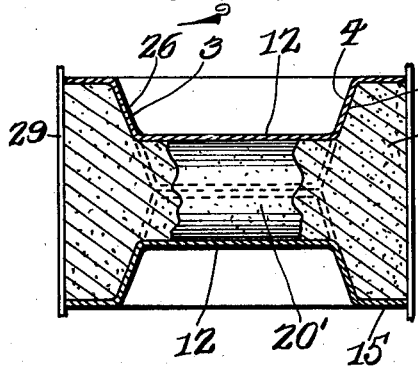
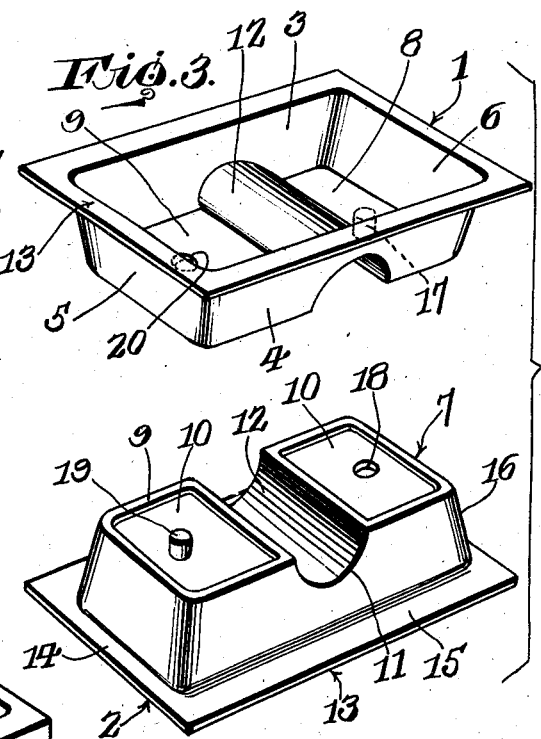
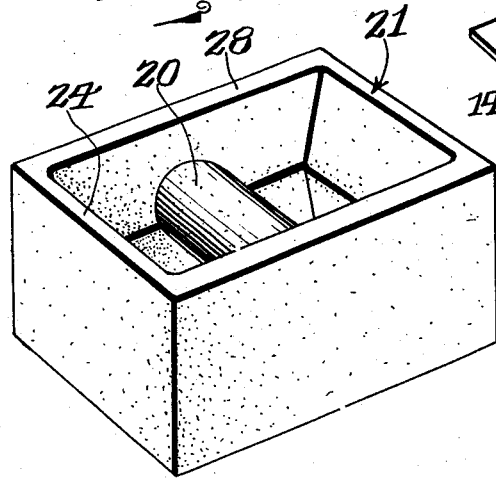
INVENTOR.
George E. Nagel,
BY
Geo. P. Kimmel
ATTORNEY.

Patented Apr. 1, 1930

1,753,061

UNITED STATES PATENT OFFICE

GEORGE E. NAGEL, OF COLUMBUS, OHIO

MOLD

Application filed May 13, 1929. Serial No. 362,699.

This invention relates to molds for manufacturing building blocks from plastic concrete, cement or other materials or combination of materials and has for its object to provide, in a manner as hereinafter set forth, a mold for forming hollow building blocks with internal hand holds to enable the expeditious handling of the blocks when occasion requires.

A further object of the invention is to provide, in a manner as hereinafter set forth, a two-part sectioned mold having the parts or sections constructed in a manner to enable the expeditious removal thereof from the molded block.

A further object of the invention is to provide, in a manner as hereinafter set forth, a mold for use for the purpose referred to and formed of two oppositely disposed sections and with the sections having coacting means to provide for the accurate arrangement thereof, relatively to each other in molded position.

Further objects of the invention are to provide, in a manner as hereinafter set forth, a mold for the purpose referred to and which is simple in its construction and arrangement, strong, durable, thoroughly efficient in its use, conveniently assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a sectional plan of a mold in accordance with this invention.

Figure 2 is a sectional plan of the mold at right angles to Figure 1.

Figure 3 is a perspective view of the mold or former sections when disassembled.

Figure 4 is a perspective view of the hollow block produced by the mold.

The mold can be of any suitable form to provide a block of the desired outline, preferably it is of rectangular contour and is so illustrated. When employed it is positioned on one of its sides and the pouring of the plastic material is had from the other of its sides.

The mold includes a pair of molding or former sections of like construction, and when employed are oppositely disposed relatively to each other and arranged with the inner side of the body portion of one section abutting the inner side of the body portion of the other section.

The two sections of the mold are generally indicated at 1, 2 and as said sections are of like construction, but one will be described, as the description of one will apply to the other. Each section includes a body portion formed of a pair of side walls 3, 4 and a pair of end walls 5, 6. The said walls merge at their inner ends into an inner wall 7 formed of a pair of spaced portions 8, 9. The portions 8, 9 have their rear faces recessed as at 10.

The walls of the body portion incline outwardly from said inner wall 7 whereby the body portion gradually increases in width and length outwardly.

The side walls 3, 4 centrally thereof have circular cutouts 11 positioned at the inner ends of such walls and integral with the portions 8, 9 as well as the edges of the cutouts 11 is a semi-cylindrical bridge piece 12 which extends into the body portion.

Formed integral with the outer ends of the walls of the body portion and co-extensive with the latter is a laterally disposed, continuous, flat flange 13 having its end portions 14 of less width than its side portions 15. The corners of the body portion are rounded as at 16.

The section 1 has the portion 8 of the inner wall 7 thereof provided with a stud or pin 17 adapted to extend into an opening 18 provided in the portion 8 of the inner wall 7 of the section 2. The portion 9 of the inner wall 7 of the section 2 is provided with a pin or stud 19 adapted to extend into an opening 20 formed in the portion 9 of the inner wall 7 of the section 1. The lugs 17 and 19, coact with the openings 18 and 20 to retain the sections of the mold, when standing on a side in abutting position from shifting relative to each other, and whereby said sections when in such position will provide a molding chamber and a series of molding cavities and which will be presently referred to. The studs 17 and 19, in connection with the openings 18, 20 also provide for the expeditious positioning of one of the mold sections relative to the other when the mold is to be employed.

When the sections 1, 2 are arranged in abutting relation and oppositely disposed, the bridge piece or member 12 of section 1 coacts with the bridge piece or member 12 of section 2 to form a cylindrical molding chamber 19' for the purpose of forming a cylindrical hand hold 20' internally of and as an integral portion of the block 21. The sections 1, 2 further when in abutting position will have the end walls 5, 6 of the body portion of said sections, in connection with the portions 14 of the flange 13 coact to provide the molding cavities 22, 23 for forming the ends of the block 21. The molding cavities 22, 23 can be closed by facing members 25 or partitions of a frame in which the molding sections are arranged. The molding sections when in abutting position further have the side walls 3, 4 thereof in connection with the portions 15 of the flange 13 coact to provide the molding cavities 26, 27 for forming the sides 28 of the block 21. The molding cavities 26, 27 can be closed by facing members 29 or partitions of the frame in which the molding sections are arranged. The cavities 22, 23 merge into the molding cavities 26, 27 and the cylindrical molding chamber 19 opens at its ends into the molding cavities 26, 27.

The block 21 when formed, owing to the inclination of the side and end walls of the body portions of the molding sections, has the inner face of each of its side and end walls extending at opposite inclinations from the longitudinal median of such face. The hand hold 20 is integral with the inner faces of the sides 28 of the block 21 and above and below the longitudinal median of each of such faces. The hand hold 20 is spaced from the side edges of the block.

Owing to the manner in which the molding sections are set up relatively to each other, after the block has been formed, such sections can be quickly removed from the block.

It is thought the many advantages of a mold, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. A mold comprising a pair of oppositely disposed sections of like construction and each including a body portion closed at its rear, open at its front and including side and end walls, a laterally extending flange integral with the outer ends of the walls of and co-extensive with said body portion, the closed rear of said body portion formed with an outwardly directed bridge piece connecting the side walls thereof together, said bridge pieces coacting to provide a molding chamber and the side and end walls of one of said body portions coacting with the side and end walls of the other of said body portions to provide molding cavities merging into each other.

2. A mold comprising a pair of oppositely disposed abutting sections of like form and each including a body portion closed at its rear and open at its front and formed of side and end walls, said walls inclining outwardly from their inner towards their outer ends, a laterally extending flange integral with the outer ends of said walls and co-extensive with said body portions, the closed rear of said body portion formed with an outwardly directed bridge piece connecting the side walls thereof together, said bridges coacting to provide a molding chamber and the walls and flange of one body portion coacting with the walls and flange of the other body portion to provide side and end molding cavities, said molding chamber opening into said side molding cavities.

3. A mold comprising a pair of oppositely disposed sections of like construction and each including a body portion closed at its rear, open at its front and including side and end walls, a laterally extending flange integral with the outer ends of the walls of and co-extensive with said body portion, the closed rear of said body portion formed with an outwardly directed bridge piece connecting the side walls thereof together, said bridge pieces coacting to provide a molding chamber and the side and end walls of one of said body portions coacting with the side and end walls of the other of said body portions to provide molding cavities merging into each other, said closed rear of said body portion having coacting means for retaining said sections in abutting engagement.

4. A mold comprising a pair of oppositely disposed abutting sections of like form and each including a body portion closed at its rear and open at its front and formed of side and end walls, said walls inclining outwardly from their inner towards their outer ends, a laterally extending flange integral with the outer ends of said walls and co-extensive with said body portions, the closed rear of said body portion formed with an outwardly directed bridge piece connecting the side walls thereof together, said bridges coacting to provide a molding chamber and the walls and flange of one body portion coacting with the walls and flange of the other body portion to provide side and end molding cavities, said molding chamber opening into said side molding cavities, said closed rear of said body portion having coacting means for retaining said sections in abutting engagement.

5. A mold comprising a pair of oppositely disposed sections of like construction closed at the rear and open at the front and adapted to have the rears thereof abut, means carried by said sections for retaining them in abutting engagement and to prevent the shifting of one relative to the other, each of said sections including a flanged body portion and a semi-cylindrical bridge piece, said flanges and body portions coacting to provide side and end molding cavities and said bridge pieces coacting to provide a molding chamber opening into the side molding cavities.

6. A mold comprising a pair of oppositely disposed sections of like construction closed at the rear and open at the front and adapted to have the rears thereof abut, means carried by said sections for retaining them in abutting engagement and to prevent the shifting of one relative to the other, each of said sections including a flanged body portion and a semi-cylindrical bridge piece, said flanges and body portions coacting to provide side and end molding cavities and said bridge pieces coacting to provide a molding chamber opening into the side molding cavities, each body portion gradually increasing in width and length from its closed to its outer end.

7. A mold comprising a pair of oppositely disposed sections of like construction and adapted to be arranged in abutting engagement, said sections having coacting means to prevent the shifting of one section relative to the other when in abutting engagement, each of said sections including a flanged, flaring body portion, the flange in said body portion being arranged at the outer end thereof, each of said body portions being closed at the inner end thereof, and each of said body portions further formed with an outwardly directed bridge piece connecting the sides of the body portion together, said bridge pieces coacting to provide a molding chamber and said body portions and flanges coacting to provide side and end molding cavities merging into each other, said molding chamber opening into said side cavities.

In testimony whereof, I affix my signature hereto.

GEORGE E. NAGEL.